Dec. 15, 1964 H. LÖRCHER 3,161,350
SEALING DEVICE FOR ROTATING PISTON ENGINES
Filed Sept. 14, 1962
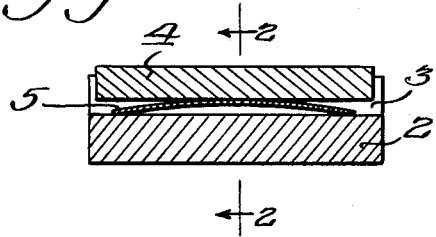
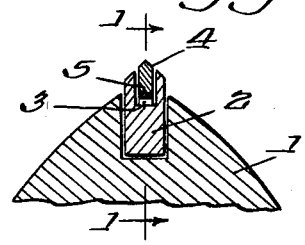
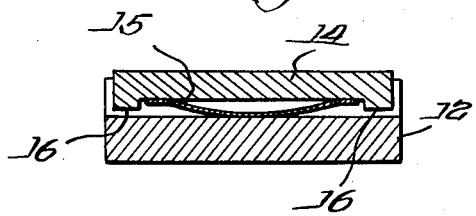
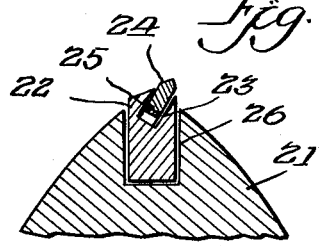
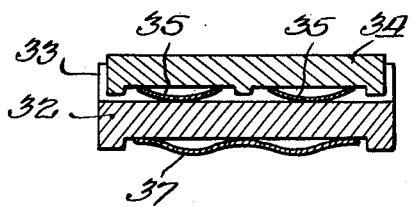
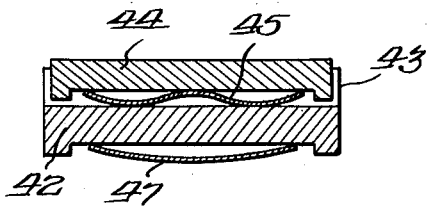
Inventor
Harry Lörcher.

United States Patent Office 3,161,350
Patented Dec. 15, 1964

3,161,350
SEALING DEVICE FOR ROTATING
PISTON ENGINES
Harry Lörcher, Witzhelden, Germany, assignor to Goetze-
werke Friedrich Goetze Aktiengesellschaft, Burscheid,
near Cologne, Germany, a corporation of Germany
Filed Sept. 14, 1962, Ser. No. 223,848
Claims priority, application Germany, Sept. 14, 1961,
G 33,122
1 Claim. (Cl. 230—145)

The invention disclosed herein is concerned with a sealing device or bar, for use in connection with rotating piston engines, which serves for sealing the rotor circumferentially with respect to the housing.

It is known to seal the rotor of a rotating piston engine circumferentially by means of sealing elements in the form of axial-parallel sealing bars which slide upon the inner wall of the housing. The bars, which are disposed in grooves formed in the rotor, are radially relatively wide so as to bridge the spacing between the outer groove edges of the rotor and the inner wall of the housing, which spacing depends upon heat expansion, production accuracy and subsequent corrective machining.

The object of the present invention is to improve the engagement of these sealing elements with the wall of the housing. It is in accordance with the invention proposed to insert the radially narrow bars resiliently in a groove of a special carrier bar. Radially narrow bars offer due to slight stiffness thereof the advantage of matching more readily possible irregularities in the housing wall or of adapting themselves more readily to such irregularities, and such bars suffer, moreover, less from distortion, since the temperatures at the sliding edge thereof and at the cooperative edge are approximately equal. Furthermore, the longitudinal play of the carrier bar, which remains cooler, can be smaller than in the case of a one-piece embodiment, since the great longitudinal play corresponding to the sliding edge temperature need be provided only for the narrow sealing bar. The total gap at the end of the sealing bar is thereby noticeably reduced.

The carrier bar may be inserted in the rotor groove either non-resiliently or in known manner resiliently. A non-resiliently disposed carrier bar is pressed outwardly by the mass forces and by the gas forces, while the resiliently disposed bar is by its intrinsic resiliency pressed in position so far that the narrow sealing bar does not move too far outwardly from the groove of the carrier bar even in the absence of gas forces or in the presence of negative mass forces.

The exchangeability of the carrier bar is in both embodiments advantageous, particularly in cases in which the slide path of the housing had been correctively machined, in which cases wider carrier bars can be used to obtain good guidance for the narrow sealing bars, without exchanging the rotor.

The springs for supporting the narrow bar and/or the carrier bar can be in known manner constructed as normal bow springs and ears may be in known manner provided on the rear faces of the bars to act as stops and to secure the springs against displacement.

An advantageous feature of the invention resides in that the springs, especially for the narrow bars, are formed as two simple arcuate springs which are operative to exert pressure on the two longitudinal halves of the bars in such a manner that the two ends of the springs support the bars at a point near the center and near the end in the manner of a scale beam. The bars are in this manner advantageously pressed in position and protected against displacement, in the presence of any type of distortion of the slide face of the housing be it in the form of depressions or elevations.

It is also advantageous, in the case of small total dimensions of the sealing elements, to employ bow springs which are bent threefold, that is, of undulating shape, with a a central arc in engagement with the center of the bar and with the ends thereof disposed near the ends of the bar.

It is further advantageous to dispose the narrow bar and/or the carrier bar at one or two different angles with respect to the radius of the rotor. It is in this manner possible to provide for a desired loading or pressure force to be exerted by the sealing edge depending upon the action of gas pressure directed from one side.

Details of the invention will appear from the description of embodiments which is rendered below with reference to the accompanying drawing.

FIGS. 1 and 2 show respectively a longitudinal and a transverse sectional view of an arrangement according to the invention;

FIG. 3 represents a longitudinal view of another embodiment;

FIG. 4 indicates a transverse sectional view of a further embodiment; and

FIGS. 5 and 6 show in longitudinal sectional views still further embodiments.

In FIGS. 1 and 2, numeral 1 indicates a portion of the edge of the rotor and numeral 2 indicates the carrier bar having a groove 3 formed therein for receiving the narrow sealing bar 4 and the supporting spring 5. The small bar is somewhat shorter than the carrier bar, thus providing for exapnsion in the presence of higher temperatures.

In FIG. 3, numeral 12 indicates the carrier bar, 14 the narrow sealing bar, and 15 the supporting spring. The narow sealing bar is provided with ears 16 forming stops for the expansion of the spring.

In FIG. 4, numeral 21 indicates a rotor edge, numeral 26 the groove for receiving the carrier bar 22 in which is formed a groove 23 for receiving the narrow bar 24, and numeral 25 indicates the pressure or supporting spring. The groove 26 for receiving the carrier bar extends radially while the groove 23 for receiving the narrow bar 24 extends at an angle to the radius of the rotor.

In FIGS. 5 and 6, numerals 32 and 42 indicate the carrier bars, numerals 33 and 43 the grooves formed therein for respectively receiving the narrow bars 34 and 44, numerals 37 and 47 indicate the pressure springs for the respective carrier bars 32 and 42, and numerals 35 and 45 indicate the pressure springs for the narrow bars. The springs 35 are constructed to act in the manner of a scale beam and the springs 37 and 45 are constructed in undulating form so as to act similarly in the manner of a scale beam.

Changes may be made within the scope and spirit of the appended claims which define what is believed to be new and desired to have protected by Letters Patent.

I claim:

A sealing device for use in connection with a rotary piston engine, comprising an elongated relatively narrow one-piece sealing bar and an elongated carrier bar which is wider than said sealing bar and having a longitudinally extending open ended groove therein extending obliquely inwardly from the outer end thereof, for receiving said sealing bar, operative to limit the motion of the latter transversely of and beyond the tip of said carrier bar, said bars being of a length to provide a sealing action at the ends thereof when in operation, said sealing bar being shorter than said carrier bar by an amount which substantially compensates for greater expansion of said sealing bar in operation due to greater sliding friction thereof, the lesser expansion of said carrier bar permitting minimum initial end clearance therefor.

(References on following page)

References Cited by the Examiner

UNITED STATES PATENTS

| | | | |
|---|---|---|---|
| 519,156 | 5/94 | Krauss et al. | 91—140 |
| 562,843 | 6/96 | Morse | 91—87 X |
| 674,258 | 5/01 | Croston | 103—136 |
| 1,023,360 | 4/12 | Brauer | 91—87 |
| 1,350,231 | 8/20 | McFarland | 123—8 |
| 1,964,492 | 6/34 | Yandell | 103—136 |
| 2,829,603 | 4/58 | Clark | 103—136 |

FOREIGN PATENTS

| | | |
|---|---|---|
| 583,973 | 11/24 | France. |
| 1,006,861 | 1/52 | France. |
| 166,786 | 7/21 | Great Britain. |

JOSEPH H. BRANSON, Jr., *Primary Examiner.*